United States Patent
Matsumoto et al.

(10) Patent No.: US 10,803,407 B2
(45) Date of Patent: Oct. 13, 2020

(54) METHOD FOR SELECTING LEARNED MODEL CORRESPONDING TO SENSING DATA AND PROVISIONING SELECTED LEARNED MODEL, AND LEARNED MODEL PROVISION DEVICE

(71) Applicant: PANASONIC INTELLECTUAL PROPERTY MANAGEMENT CO., LTD., Osaka (JP)

(72) Inventors: Yuichi Matsumoto, Kanagawa (JP); Masataka Sugiura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 90 days.

(21) Appl. No.: 16/097,998

(22) PCT Filed: Dec. 11, 2017

(86) PCT No.: PCT/JP2017/044296
§ 371 (c)(1),
(2) Date: Oct. 31, 2018

(87) PCT Pub. No.: WO2018/142765
PCT Pub. Date: Aug. 9, 2018

(65) Prior Publication Data
US 2019/0147360 A1     May 16, 2019

(30) Foreign Application Priority Data

Feb. 3, 2017  (JP) ................................ 2017-018294

(51) Int. Cl.
*G06N 20/00*     (2019.01)
*H04L 29/06*     (2006.01)
(Continued)

(52) U.S. Cl.
CPC ........... *G06N 20/00* (2019.01); *G06K 9/6262* (2013.01); *G06Q 30/06* (2013.01); *H04L 67/327* (2013.01); *H04L 67/42* (2013.01)

(58) Field of Classification Search
CPC ...... G06K 9/6262; G06N 20/00; G06N 20/10; G06N 20/20; G06N 3/08; G06Q 30/06; H04L 67/327
See application file for complete search history.

(56) References Cited

U.S. PATENT DOCUMENTS 10,423,674 B1 * 9/2019 Burriesci ................ H04L 67/02
2002/0147793 A1 10/2002 Ooishi
(Continued)

FOREIGN PATENT DOCUMENTS

JP   2002-268684   9/2002
JP   2002-288217   10/2002
(Continued)

OTHER PUBLICATIONS

Official Communication issued in International Pat. Appl. No. PCT/JP2017/044296, dated Mar. 13, 2018.
(Continued)

*Primary Examiner* — Mohamed A. Wasel
(74) *Attorney, Agent, or Firm* — Greenblum & Bernstein, P.L.C.

(57) ABSTRACT

A method for selectively providing a learned model using a learned model providing device includes saving various learned models and model information associated with a generation environment in a database of the learned model providing device. The generation environment indicates an environment where sensing data used for generating each of the learned models is sensed. The method further includes acquiring needs information associated with a use environment of a user side device, and selecting one of the learned (Continued)

model suitable for the needs information by referring to the model information by a processor of the learned model providing device.

16 Claims, 4 Drawing Sheets

(51) Int. Cl.
    *H04L 29/08*      (2006.01)
    *G06K 9/62*      (2006.01)
    *G06Q 30/06*      (2012.01)

(56) References Cited

U.S. PATENT DOCUMENTS

| | | |
|---|---|---|
| 2012/0284213 A1 | 11/2012 | Lin et al. |
| 2014/0372561 A1 | 12/2014 | Hisano |
| 2015/0088606 A1* | 3/2015 | Tyagi ................ G06Q 30/0202 |
| | | 705/7.31 |
| 2015/0242760 A1 | 8/2015 | Miao et al. |
| 2016/0210862 A1 | 7/2016 | Hisano |
| 2017/0177822 A1* | 6/2017 | Fogel .................... G16H 10/60 |
| 2017/0270432 A1* | 9/2017 | Sachdev ................ H04L 41/16 |
| 2018/0129959 A1* | 5/2018 | Gustafson .............. G06N 20/00 |

FOREIGN PATENT DOCUMENTS

| | | |
|---|---|---|
| JP | 5445722 | 1/2014 |
| JP | 2016-048417 | 4/2016 |

OTHER PUBLICATIONS

The Extended European Search Report dated Nov. 27, 2019 for European Patent Application No. 17895373.3.

* cited by examiner

METHOD FOR SELECTING LEARNED MODEL CORRESPONDING TO SENSING DATA AND PROVISIONING SELECTED LEARNED MODEL, AND LEARNED MODEL PROVISION DEVICE

TECHNICAL FIELD

The present disclosure relates to a method for providing a learned model and a learned model providing device that select one or more learned models from a plurality of the learned models saved in database in advance according to a use request acquired from a user side device and provide the selected learned model to the user side device.

BACKGROUND ART

In the related art, in order to optimize circulation of sensing data in a sensor network that uses sensing data, a technique for performing matching a sensor side metadata with an application side metadata to extract the sensor capable of providing the sensing data satisfying a request of the application is known. The sensor side metadata is information on a sensor that outputs the sensing data, and the application side metadata is information on an application that provides a service using the sensing data (see PTL 1).

CITATION LIST

Patent Literature

PTL 1: Japanese Patent No. 5445722

SUMMARY OF THE INVENTION

The main object of the present disclosure is to select a learned model suitable for the needs of a user side from the learned models saved in advance and provide the selected learned model.

A method for providing a learned model of the present disclosure includes saving a plurality of the learned models and model information that is at least one information of a function and a generation environment of each of the learned models in advance, acquiring needs information that is at least one information of the function and a use environment of the learned model requested by a user side device from the user side device, and selecting the learned model suitable for the needs information from the plurality of learned models by referring to the model information.

According to the present disclosure, it is possible to select and provide the learned model suitable for the user side needs from the plurality of learned models saved in advance.

DESCRIPTION OF EMBODIMENTS

A first disclosure made to solve the above problems is a method for providing a learned model of the present disclosure including saving a plurality of the learned models and model information that is at least one information of a function and a generation environment of each of the learned models in advance; acquiring needs information that is at least one information of the function and a use environment of the learned model requested by a user side device from the user side device; and selecting the learned model suitable for the needs information from the plurality of learned models by referring to the model information.

According to the method for providing a learned model according to the first disclosure, since the learned model to be provided to the user side device can be selected from the plurality of learned models saved in advance based on the needs information that is at least one information of the function and the use environment of the learned model requested by the user side device from the user side device, it is possible to select and provide the learned model suitable for the user side needs from the plurality of learned models saved in advance.

In addition, according to a second disclosure, in the first disclosure, the model information includes saved model information that is information on at least one of a use purpose of the learned model, a performance of the learned model, a usage compensation of the learned model, and the number of data items of learning data used for generating the learned model, and the needs information includes request model information that is information on at least one of a use purpose of the learned model requested by the user side device, a performance of the learned model requested by the user side device, a usage compensation of the learned model requested by the user side device, and the number of data items of user side data to be used when using the learned model by the user side device.

According to the method for providing a learned model according to the second disclosure, since the learned model can be selected based on the request model information that is information on the function or the like of the learned model requested by the user side device, it is possible to select the learned model which is better suitable for the user side needs.

In addition, according to a third disclosure, in the first or second disclosure, the model information includes generation environment information that is information on at least one of an acquiring condition of the learning data used for generating the learned model and an installation environment of a device used for acquiring the learning data, and the needs information includes use environment information that is information on at least one of an acquiring condition of the user side data to be used when using the learned model by the user side device and an installation environment of a device used for acquiring the user side data.

According to the method for providing a learned model according to the third disclosure, since the learned model can be selected based on the use environment information that is information on an acquisition environment of the user side data, it is possible to select the learned model which is better suitable for the user side needs.

In addition, according to a fourth disclosure, in the first disclosure, the model information includes necessary resource information that is information on a resource or a capability of a device necessary for using the learned model, and the needs information includes user side resource information that is information on a resource or a capability of at least one device of the user side device and a device to be used for acquiring user side data which is to be used when using the learned model in the user side device.

According to the method for providing a learned model according to the fourth disclosure, since the learned model can be selected based on the user side resource information that is information on the resources or the capability of at least one device of the user side device and the device to be used for acquiring the user side data, it is possible to select the learned model which is better suitable for the user side needs.

In addition, according to a fifth disclosure, in the first disclosure, the model information of the selected learned model is presented to the user side device, and when information indicating the learned model for which use on the user side device is determined is acquired from the user side device, the learned model for which the use on the user side device is determined is provided to the user side device.

According to the method for providing a learned model according to the fifth disclosure, the user of the user side device can determine the learned model to be used by the user side device based on the model information of the selected learned model.

In addition, according to a sixth disclosure, in the first disclosure, an advisability of the learned model is given to the selected learned model and information indicating the advisability of the selected learned model is presented to the user side device, and when information indicating the learned model for which use on the user side device is determined is acquired from the user side device, the learned model for which the use on the user side device is determined is provided to the user side device.

According to the method for providing a learned model according to the sixth disclosure, the user of the user side device can determine the learned model to be used by the user side device based on the advisability of the selected learned model.

In addition, according to a seventh disclosure, in the sixth disclosure, the advisability is determined based on at least one of a usage record of the learned model, an evaluation of the learned model, and the number of learning data items used for generating the learned model.

According to the method for providing a learned model according to the seventh disclosure, it is possible to easily and appropriately determine the advisability.

In addition, an eighth disclosure is a learned model providing device including one or more processors, a database in which a plurality of the learned models and model information that is at least one information of a function and a generation environment of each of the learned models are saved in advance, and a communicator that performs communication with a user side device, in which the processor acquires needs information that is at least one information of the function and a use environment of the learned model requested by a user side device from the user side device, and selects the learned model suitable for the needs information from the plurality of learned models by referring to the model information.

According to the learned model providing device according to the eighth disclosure, since the learned model to be provided to the user side device can be selected from the plurality of learned models saved in advance based on the needs information that is at least one information of the function and the use environment of the learned model requested by the user side device, it is possible to select and provide the learned model suitable for the user side needs from the plurality of learned models saved in advance.

In addition, according to a ninth disclosure, in the eighth disclosure, the model information includes saved model information that is information on at least one of a use purpose of the learned model, a performance of the learned model, a usage compensation of the learned model, and the number of data items of learning data used for generating the learned model, and the needs information includes request model information that is information on at least one of a use purpose of the learned model requested by the user side device, a performance of the learned model requested by the user side device, a usage compensation of the learned model requested by the user side device, and the number of data items of user side data to be used when using the learned model by the user side device.

According to the learned model providing device according to the ninth disclosure, since the learned model can be selected based on the request model information that is information on the function or the like of the learned model requested by the user side device, it is possible to select the learned model which is better suitable for the user side needs.

In addition, according to a tenth disclosure, in the eighth or ninth disclosure, the model information includes generation environment information that is information on at least one of an acquiring condition of the learning data used for generating the learned model and an installation environment of a device used for acquiring the learning data, and the needs information includes use environment information that is information on at least one of an acquiring condition of the user side data to be used when using the learned model by the user side device and an installation environment of a device used for acquiring the user side data.

According to the learned model providing device according to the tenth disclosure, since the learned model can be selected based on the use environment information that is information on an acquisition environment of the user side data, it is possible to select the learned model which is better suitable for the user side needs.

In addition, according to an eleventh disclosure, in the eighth disclosure, the model information includes necessary resource information that is information on a resource or a capability of a device necessary for using the learned model, and the needs information includes user side resource information that is information on a resource or a capability of at least one device of the user side device and a device to be used for acquiring user side data which is to be used when using the learned model in the user side device.

According to the learned model providing device according to the eleventh disclosure, since the learned model can be selected based on the user side resource information that is information on the resources or the capability of at least one device of the user side device and the device to be used for acquiring the user side data, it is possible to select the learned model which is better suitable for the user side needs.

In addition, according to a twelfth disclosure, in the eighth disclosure, the processor presents the model information of the selected learned model to the user side device, and when information indicating the learned model for which use on the user side device is determined is acquired from the user side device, provides the learned model for which the use on the user side device is determined to the user side device.

According to the learned model providing device according to the twelfth disclosure, the user of the user side device can determine the learned model to be used by the user side device based on the model information of the selected learned model.

In addition, according to a thirteenth disclosure, in the eighth disclosure, the processor gives an advisability of the learned model to the selected learned model and presents model information of the selected learned model to the user side device, and when information indicating the learned model for which use on the user side device is determined is acquired from the user side device, provides the learned model for which the use on the user side device is determined to the user side device.

According to the learned model providing device according to the thirteenth disclosure, the user of the user side device can determine the learned model to be used by the user side device based on the advisability of the selected learned model.

In addition, according to a fourteenth disclosure, in the thirteenth disclosure, the advisability is determined based on at least one of a usage record of the learned model, an evaluation of the learned model, and the number of learning data items used for generating the learned model.

According to the learned model providing device according to the fourteenth disclosure, it is possible to easily and appropriately determine the advisability.

Hereinafter, embodiments of the present disclosure will be described with reference to the drawings.

In recent years, research and development of machine learning technology using a neural network in a field of image recognition, sound recognition, and the like has been remarkable. Specifically, when deep learning technology is used, examples that can realize recognition accuracy which could not be obtained by the image recognition and sound recognition technology using a conventional feature amount base have been reported, and application to various industries is also examined. In deep learning, when learning image data or sound data are input to an input layer of a multilayered neural network, learning processing is performed so that output data (correct data) that is a correct recognition result is output from the output layer. Typically, the output data is annotation or metadata for the input data. For example, the output data is a name, a type, and an attribute of the imaged object that appears when the input data is an image, a word or a sentence that is uttered when the input data is a sound. In the learning processing of deep learning, a weight value of the coupling (synaptic coupling) between nodes configuring the neural network is updated using a known algorithm (for example, in a reverse error propagation method, adjust and update the weight value so as to reduce the error from the correct at the output layer, or the like). An aggregate of the weight values between the nodes on which the learning process is completed is called a "learned model". By applying the learned model to a neural network having the same configuration as the neural network used in the learning process (setting as the weight value of inter-node coupling), it is possible to output correct data with a constant precision as output data (recognition result) when inputting unknown input data, i.e., new input data not used in learning processing, into the neural network. Therefore, in a device different from a device that generates the learned model (that is, learning process), by configuring the neural network using the learned model and executing recognition processing, it is possible to perform the image recognition and voice recognition by the learned recognition accuracy.

The inventors have found that there is a complicated problem in selecting a specific learned model from a plurality of the learned models when trying to perform image recognition, sound recognition, and the like. That is because at least one of the following problems exists, that is, (1) it is necessary to carefully understand the model because the characteristics of the learned model tend to be greatly influenced by the environment where the sensing device that gained learning data was installed, or (2) it is difficult to search for a model that fulfills a desired function because the function of the learned model is diverse.

Learned model providing system 1 according to the present disclosure is a system for selecting one or more learned models suitable for use purpose of the user side device from the plurality of learned models saved in a database in advance and providing the selected learned models to the user side device according to a use request acquired from the user side device. The learned model referred to in the present specification is a model generated by machine learning (for example, deep learning using a multilayered neural network, support vector machine, boosting, reinforcement learning, or the like) based on learning data and correct answer data (teacher data).

Figure 1:
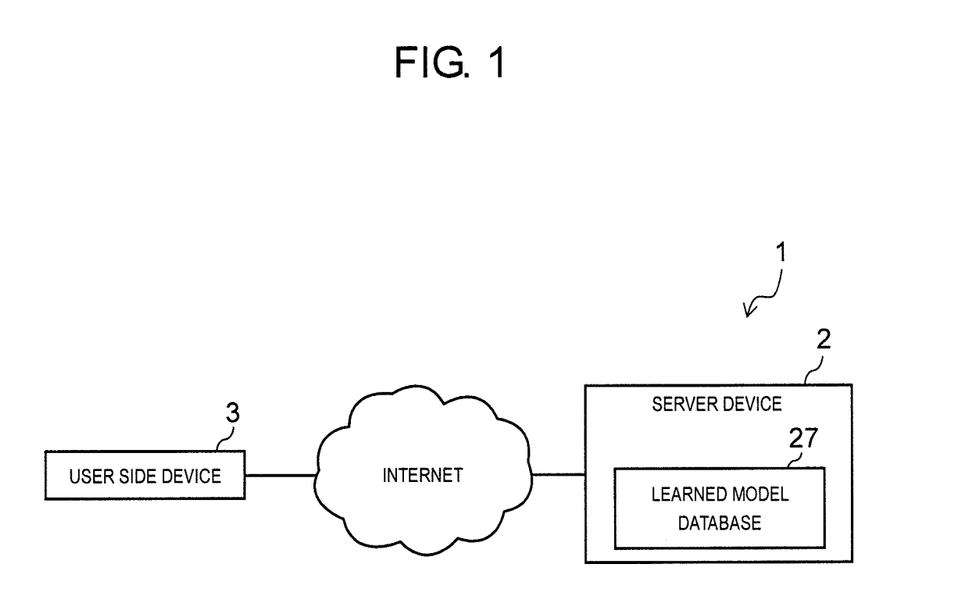
FIG. 1 is an overall configuration diagram of a learned model providing system according to the present disclosure.

FIG. 1 is an overall configuration diagram of learned model providing system 1 according to the present disclosure. As illustrated in FIG. 1, learned model providing system 1 according to the present disclosure is configured of learned model providing device 2 (hereinafter, referred to as "server device") which saves the plurality of learned models in advance and user side device 3 that receives the learned model from server device 2. Server device 2 and user side device 3 are connected to each other via a network such as the Internet.

Server device 2 is a general computer device, and saves a plurality of the learned models in learned model database 27 (see FIG. 2B) to be described later. When receiving the use request including the use purpose from user side device 3, server device 2 selects the learned model suitable for the use purpose from the plurality of learned models saved in learned model database 27 and transmits the selected learned models to user side device 3. In this manner, server device 2 may be configured as a cloud server for providing the learned model saved in advance to user side device 3.

Figure 2A:
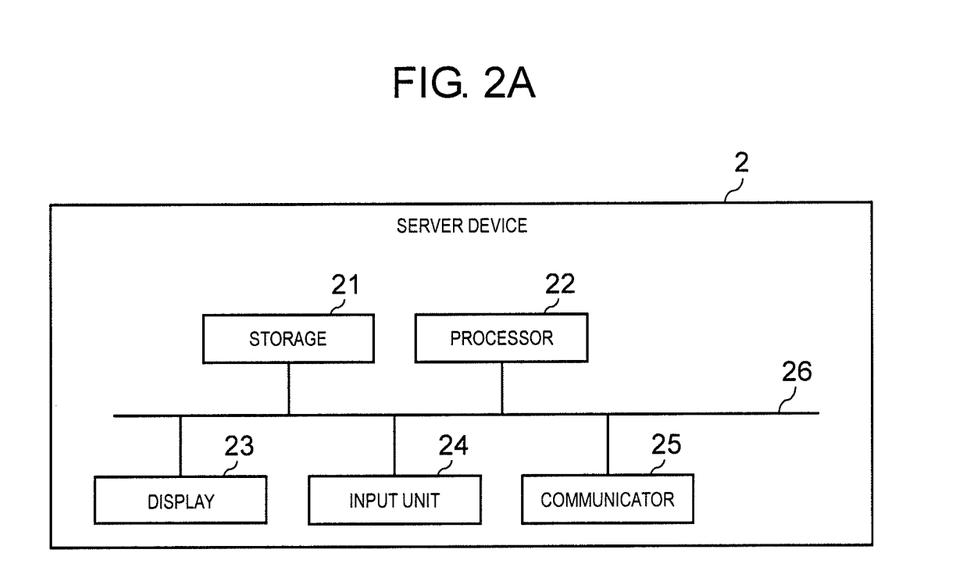
FIG. 2A is a block diagram illustrating a schematic configuration of a server device.
Figure 2B:
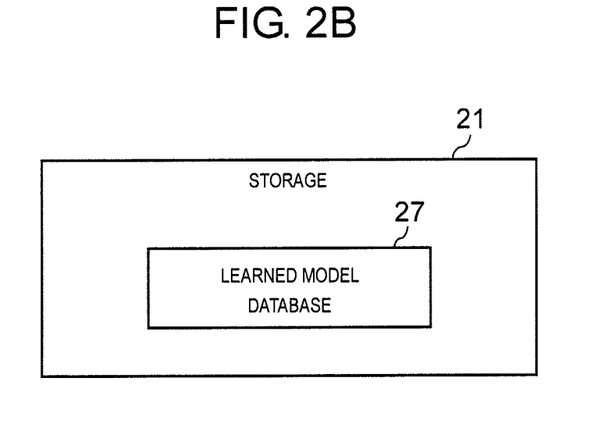
FIG. 2B is a block diagram illustrating a schematic configuration of a storage of the server device.

FIG. 2A is a block diagram illustrating a schematic configuration of server device 2, and FIG. 2B is a block diagram illustrating a schematic configuration of a storage of server device 2. As shown in FIG. 2A, server device 2 includes storage 21, processor 22, display 23, an input unit 24, communicator 25, and bus 26 connecting these components.

Storage 21 is a storage device (storage) such as a read only memory (ROM) or a hard disk, and stores various programs and various data items for realizing each function of server device 2. In addition, as illustrated in FIG. 2B, storage 21 stores learned model database 27. Processor 22 is, for example, a central processing unit (CPU), reads various programs and various data items from storage 21 onto a random access memory (RAM) not shown, and executes each processing of server device 2. Display unit 23 is configured of a display such as a liquid crystal display panel and is used for displaying the processing result in processor 22 and the like. Input unit 24 is configured of an input device such as a keyboard, mouse, and the like, and is used for operating server device 2. Communicator 25 communicates with user side device 3 via a network such as the Internet.

The plurality of learned models are saved in learned model database 27 in advance. In addition, the model information that is at least one information of the function and generation environment of the learned model for each of the plurality of learned models is stored in advance in learned model database 27. The model information includes saved model information, generation environment information, and necessary resource information.

The saved model information includes information on at least one of a function of the learned model, a performance of the learned model, a usage compensation of the learned model, and the number of data items of learning data (sensing data) used for generating the learned model.

The function of the learned model is the use purpose or use application of the learned model. For example, in a case where the learned model is a learned model that performs some estimation on a person from a captured image including the person, examples of functions of the learned model include a face detection function, a human body detection function, a motion detection function, a posture detection function, a person attribute estimation function, a person behavior prediction function, and the like. The function of the learned model is not limited to these, and may be various functions according to the use purpose of the learned model. The performance of the learned model is, for example, the correct rate (correctness degree), a relevance rate, a reappearance rate, a type or number of hierarchies of the neural network model, or the like when processing such as the image analysis processing using the learned model is performed. The usage compensation of the learned model is, for example, a virtual currency or a point.

The generation environment information is information on an acquisition environment of the learning data (sensing data) used for generating the learned model, specifically, includes information on at least one of an acquiring condition of learning data and an installation environment of a device used for acquiring the learning data. For example, in a case where the learning data is a captured image and the device used for acquiring the learning data is a camera, examples of acquiring conditions of learning data include imaging time (for example, day, night, or the like), an imaging environment (for example, weather, illuminance, or the like), the number of cameras, and various imaging parameters (for example, installation height, imaging angle, focal distance, zoom magnification, resolution, or the like) of the camera, and the like. Examples of the installation environment of the device (camera) used for acquiring the learning data include a place where the camera is installed (for example, a convenience store, a station, a shopping mall, a factory, an airport, or the like), an environment around the camera (for example, outside the room, inside the room, or the like) and the like.

The necessary resource information is information on the resource or capability of the device necessary for using the learned model, and specifically, includes information on the resource and the capability (resource and specification) of the computer device that performs processing using the learned model and on the resource and the capability (resource and specification) of the device (for example, the camera) to be used for acquiring the user side data which is to be used when using the learned model by the computer device. The resource or capability of the computer device includes the CPU type, the type (or the number) of the GPU, the type of the OS, the neural network model, the number of hierarchies, and the like possessed by the computer device.

User side device 3 is a general computer device and is used for performing image analysis processing, new machine learning, and the like using the learned model provided from server device 2. As described above, provision of the learned model from server device 2 to user side device 3 is performed by user side device 3 transmitting a use request to server device 2.

Figure 3:
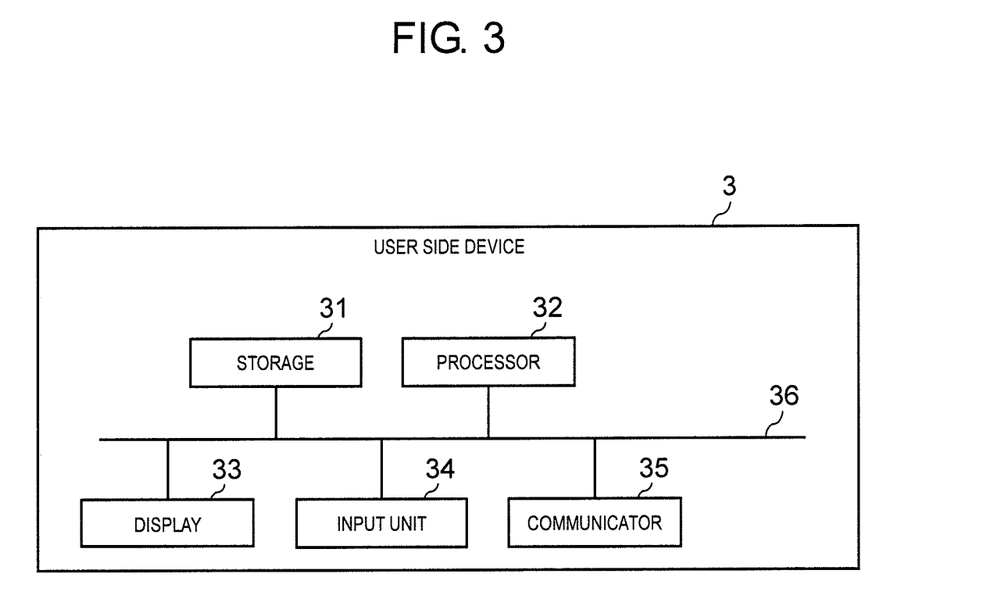
FIG. 3 is a block diagram illustrating a schematic configuration of a user side device.

FIG. 3 is a block diagram illustrating a schematic configuration of user side device 3. As shown in FIG. 3, user side device 3 includes storage 31, processor 32, display 33, input unit 34, communicator 35, and bus 36 connecting these components.

Storage 31 is a storage device (storage) such as a read only memory (ROM) or a hard disk, and stores various programs and various data items for realizing each function of user side device 3. Processor 32 is, for example, a CPU, reads various programs and various data items from storage 31 onto a RAM not shown, and executes each processing of user side device 3. Display 33 is configured of a display such as a liquid crystal display panel and is used for displaying the processing result in processor 32 and the like. Input unit 34 is configured of an input device such as a keyboard, mouse, and the like, and is used for operating user side device 3. Communicator 35 communicates with server device 2 via a network such as the Internet.

The above-described devices of learned model providing system 1 are not limited to computer devices, and other information processing devices (for example, servers or the like) capable of obtaining similar functions can also be used. In addition, at least a part of the functions of the each device of learned model providing system 1 may be replaced by other known hardware processing.

Figure 4:
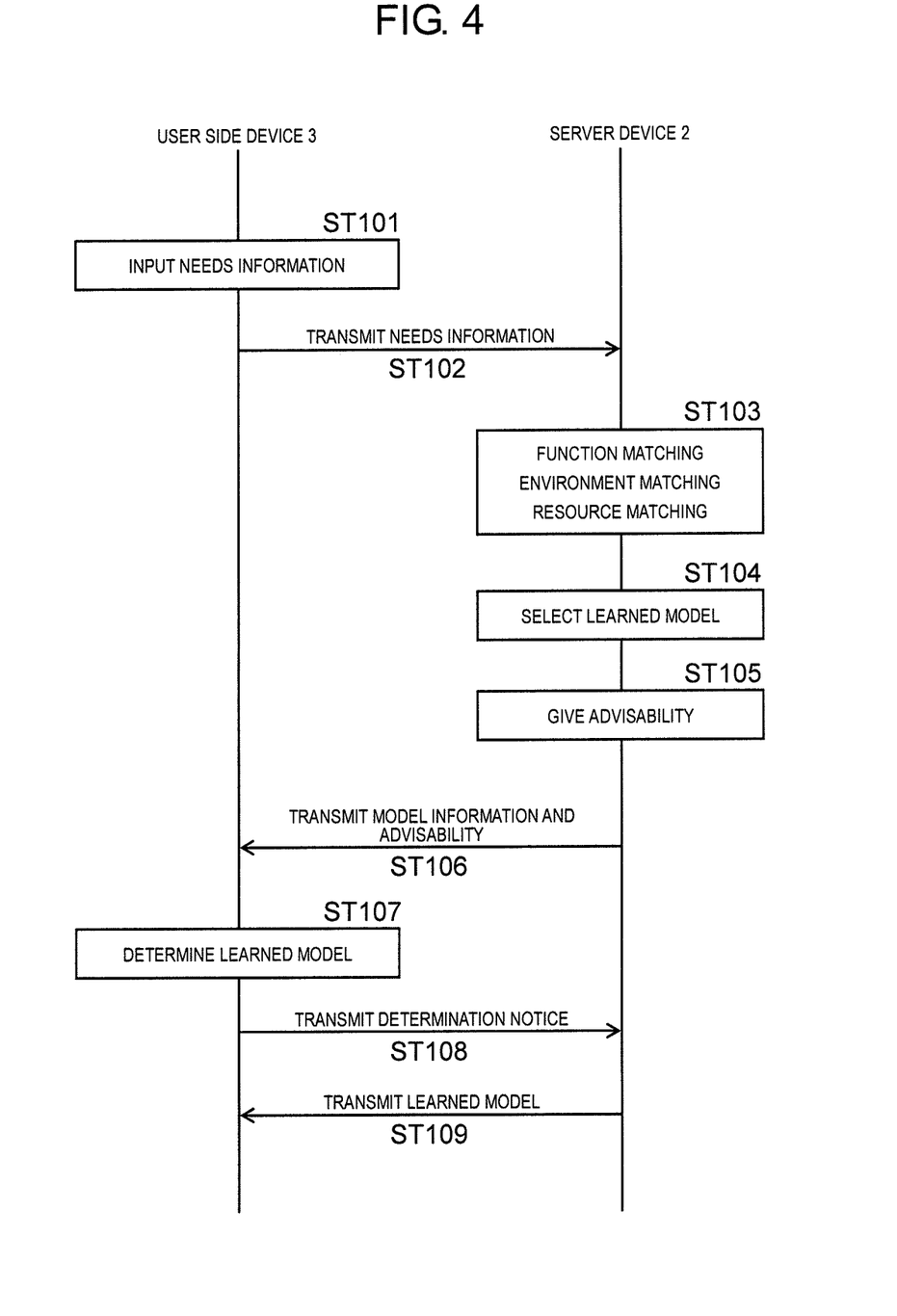
FIG. 4 is a sequence diagram illustrating an operation procedure of a learned model providing system.

FIG. 4 is a sequence diagram illustrating an operation procedure of learned model providing system 1. Hereinafter, the operation procedure of server device 2 and user side device 3 of learned model providing system 1 will be described with reference to the sequence diagram of FIG. 4.

First, the user of user side device 3 operates input unit 34 to input needs information that is at least one information of the function and the use environment of the learned model requested by the user to user side device 3 (step ST101). The needs information includes request model information, use environment information, user side device 3, and user side resource information.

The request model information includes at least one information of the function of the learned model requested by user side device 3, the performance of the learned model requested by user side device 3, the usage compensation of the learned model requested by user side device 3, and the number of data items of user side data (sensing data) to be used when using the learned model by user side device 3.

The function of the learned model requested by user side device 3 is the use purpose or use application of the learned model. For example, in a case where the learned model is a learned model that performs some estimation on a person from a captured image including the person, examples of functions of the learned model include a face detection function, a human body detection function, a motion detection function, a posture detection function, a person attribute estimation function, a person behavior prediction function, and the like. The function of the learned model is not limited to these, and may be various functions according to the use purpose of the learned model. The performance of the learned model requested by user side device 3 is, for example, the correct rate (correctness degree), a relevance rate, a reappearance rate, a type or number of hierarchies of the neural network model, or the like when processing such as the image analysis processing is performed using the learned model. The usage compensation of the learned model is, for example, a virtual currency or a point.

The use environment information is information on an acquisition environment of the user side data (sensing data) used when using the learned model by user side device 3, specifically, includes information on at least one of an acquiring condition of user side data and an installation environment of a device used for acquiring the user side data. For example, in a case where the user side data is a captured image and the device used for acquiring the user side data is a camera, examples of acquiring conditions of user side data include imaging time (for example, day, night, or the like), an imaging environment (for example, weather, illuminance, or the like), the number of cameras, and various imaging parameters (for example, installation height, imaging angle, focal distance, zoom magnification, resolution, or the like) of the camera, and the like. Examples of the installation environment of the device (camera) used for acquiring the user side data include a place where the camera is installed (for example, a convenience store, a station, a shopping mall, a factory, an airport, or the like), an environment around the camera (for example, outside the room, inside the room, or the like) and the like.

The user side resource information is, specifically, includes information on the resource and the capability (resource and specification) of user side device 3 and on the resource and the capability (resource and specification) of the device (for example, the camera) to be used for acquiring the user side data which is to be used when using the learned model by user side device 3. The resource or capability of user side device 3 includes the CPU type, the type (or the number) of the GPU, the type of the OS, the neural network model, the number of hierarchies, and the like of user side device 3.

The request model information, the use environment information, and the user side resource information input to user side device 3 are transmitted to server device 2 via a network such as the Internet (step ST102).

When receiving the request model information, the use environment information, and the user side resource information from user side device 3, server device 2 performs matching between the request model information and saved model information (hereinafter, referred to as "function matching"), matching between the use environment information and the generation environment information (hereinafter, referred to as "environment matching"), and matching between the user side resource information and the necessary resource information (hereinafter, referred to as "resource matching"), respectively (step ST103). As described above, the saved model information, the generation environment information, and the necessary resource information are stored in learned model database 27 in advance. Each matching of the function matching, the environment matching, and the resource matching is performed by the well-known matching method. For example, a method based on a distance between parameters (similarity) of each item of normalized information is typically used. However, various matching methods such as statistical matching, hierarchical matching, or propensity score analysis may be used.

Subsequently, server device 2 selects the learned model to be provided from the plurality of learned models saved in learned model database 27 to user side device 3 based on each result of the function matching, the environment matching, and the resource matching (step ST104). For example, the learned model in which each result of the function matching, the environment matching, and the resource matching exceeds a predetermined threshold or rank for each matching may be selected as the learned model to be provided to user side device 3.

Next, server device 2 gives an advisability of the learned model to the selected learned model (step ST105). In a case where there are a plurality of selected learned models, the advisability is given to each of the selected learned models. The advisability is determined based on at least one of the usage record of the learned model, the evaluation of the learned model, and the number of learning data used for generating the learned model. In addition, at least one of the function matching, the environment matching, and the resource matching may be used for determining the advisability. For the usage record, use history of the learned model may be used. The evaluation, reputation, or the like obtained from the outside via a network such as the Internet may be used for the evaluation. The use history and the evaluation may be stored in the learned model database 27 in advance in association with the learned model.

Server device 2 transmits the saved model information, the generation environment information, the necessary resource information, and the advisability of the selected learned model to user side device 3 (step ST106). As described above, the saved model information and the generation environment information are stored in learned model database 27 in advance. Accordingly, the saved model information, the generation environment information, and the advisability of the learned model selected by server device 2 can be presented to the user of user side device 3.

When user side device 3 receives the saved model information, the generation environment information, the necessary resource information, and the advisability of the selected learned model from server device 2, user side device 3 displays a screen indicating the received information on display 33. The user of user side device 3 confirms the information displayed on display 33 and determines the learned model to be used by user side device 3 (step ST107). Specifically, in a case where the selected learned model is one, the user of user side device 3 determines whether or not to accept the use of the learned model, and in a case where there are a plurality of the selected learned models, the user determines whether to use one of the plurality of learned models or not to use any learned models.

The determination result of the user of user side device 3 is input to user side device 3 via input unit 34. The determination result input to user side device 3 is transmitted from user side device 3 to server device 2 as a determination notice (step ST108). Server device 2 transmits the learned model determined by user side device 3 to user side device 3 based on the determination notice received from user side device 3 (step ST109).

In this manner, in learned model providing system 1 according to the present disclosure, since server device 2 can select the learned model to be provided to user side device 3 from the plurality of learned models saved in learned model database 27 based on needs information acquired from user side device 3, it is possible to select the learned model suitable for the user side needs.

In addition, in learned model providing system 1 according to the present disclosure, since the model information and the advisability of the learned model selected by server device 2 can be presented to the user of user side device 3, it is possible to determine the learned model to be used by user side device 3 based on the information items by the user of user side device 3.

Although the present disclosure has been described based on the specific embodiments, these embodiments are merely examples, and the present disclosure is not limited by these embodiments. In addition, all the configuration elements of the method for providing a learned model and the learned model providing device according to the present disclosure described in the above embodiment are not necessarily essential, and it is possible to appropriately select at least the element as long as they do not deviate from the scope of the present disclosure.

For example, in the present embodiments, both the model information and the advisability are presented to user side device 3 after selecting the learned model, but only one of the model information and the advisability may be presented.

In addition, the step of presenting one or both of the model information and the advisability after selecting the learned model may be omitted. In addition, in the present embodiment, the image data is exemplified as learning data and user side data (sensing data). However, the learning data and the user side data are not limited to the image data. For example, the learning data and the user side data may be a sound, temperature, humidity, vibration, weather, and the like. The method for providing a learned model and the learned model providing device according to the present disclosure can be applied to the learned models using various data items in various fields such as manufacture, distribution, public service, transportation, medical care, education, or finance.

INDUSTRIAL APPLICABILITY

The method for providing a learned model and the learned model providing device according to the present disclosure are useful as the method for providing a learned model and the learned model providing device capable of selecting and providing a learned model suitable for the user side needs from the plurality of learned models saved in advance.

REFERENCE MARKS IN THE DRAWINGS

1 LEARNED MODEL PROVIDING SYSTEM
2 LEARNED MODEL PROVIDING DEVICE (SERVER DEVICE)
3 USER SIDE DEVICE
22 PROCESSOR
25 COMMUNICATOR
27 LEARNED MODEL DATABASE

The invention claimed is:

1. A method for providing a learned model comprising:
saving a plurality of the learned models and model information that is information associated with a generation environment which indicates an environment where sensing data used for generating each of the learned models has been sensed, in advance;
acquiring needs information that is information associated with a use environment which indicates an environment where sensing data to use the learned model is to be sensed by a user side device from the user side device; and
selecting the learned model suitable for the needs information from the plurality of learned models by referring to the model information.

2. The method for providing a learned model of claim 1, wherein the model information includes saved model information that is information on at least one of a use purpose of the learned model, a performance of the learned model, a usage compensation of the learned model, and the number of data items of learning data used for generating the learned model, and
wherein the needs information includes request model information that is information on at least one of a use purpose of the learned model requested by the user side device, a performance of the learned model requested by the user side device, a usage compensation of the learned model requested by the user side device, and the number of data items of user side data to be used when using the learned model by the user side device.

3. The method for providing a learned model of claim 1, wherein the model information includes generation environment information that is information on at least one of an acquiring condition of the learning data used for generating the learned model and an installation environment of a device used for acquiring the learning data, and
wherein the needs information includes use environment information that is information on at least one of an acquiring condition of the user side data to be used when using the learned model by the user side device and an installation environment of a device used for acquiring the user side data.

4. The method for providing a learned model of claim 1, wherein the model information includes necessary resource information that is information on a resource or a capability of a device necessary for using the learned model, and
wherein the needs information includes user side resource information that is information on a resource or a capability of at least one device of the user side device and a device to be used for acquiring user side data which is to be used when using the learned model in the user side device.

5. The method for providing a learned model of claim 1, further comprising acquiring use information that indicates the learned model for which use on the user side device is determined,
wherein the model information of the selected learned model is presented to the user side device, and
wherein, when the use information is acquired from the user side device, the learned model indicated by the use information is provided to the user side device.

6. The method for providing a learned model of claim 1, wherein an advisability of the learned model is given to the selected learned model and information indicating the advisability of the selected learned model is presented to the user side device, and
wherein when information indicating the learned model for which use on the user side device is determined is acquired from the user side device, the learned model for which the use on the user side device is determined is provided to the user side device.

7. The method for providing a learned model of claim 6, wherein the advisability is determined based on at least one of a usage record of the learned model, an evaluation of the learned model, and the number of learning data items used for generating the learned model.

8. The method for providing a learned model of claim 1, further comprising:
generating the plurality of learned models,
wherein the plurality of learned models is generated under different generation environments.

9. The method for providing a learned model of claim 1, further comprising:
matching the information associated with the use environment to the information of the generation environment, wherein
the selecting of the learned model is based on the matching between the information associated with the use environment and the information of the generation environment.

10. A learned model providing device comprising:
one or more processors;
a database that saves, in advance, a plurality of learned models and model information that is information associated with a generation environment which indicates an environment where sensing data used for generating each of the learned models has been sensed; and a communicator that performs communication with a user side device, wherein the processor acquires needs information that is information associated with a use environment which indicates an environment where sensing data to use the learned model is to be sensed by a user side device from the user side device, and selects the learned model suitable for the needs information from the plurality of learned models by referring to the model information.

11. The learned model providing device of claim 10, wherein the model information includes saved model information that is information on at least one of a use purpose of the learned model, a performance of the learned model, a usage compensation of the learned model, and the number of data items of learning data used for generating the learned model, and wherein the needs information includes request model information that is information on at least one of a use purpose of the learned model requested by the user side device, a performance of the learned model requested by the user side device, a usage compensation of the learned model requested by the user side device, and the number of data items of user side data to be used when using the learned model by the user side device.

12. The learned model providing device of claim 10, wherein the model information includes generation environment information that is information on at least one of an acquiring condition of the learning data used for generating the learned model and an installation environment of a device used for acquiring the learning data, and wherein the needs information includes use environment information that is information on at least one of an acquiring condition of the user side data to be used when using the learned model by the user side device and an installation environment of a device used for acquiring the user side data.

13. The learned model providing device of claim 10, wherein the model information includes necessary resource information that is information on a resource or a capability of a device necessary for using the learned model, and wherein the needs information includes user side resource information that is information on a resource or a capability of at least one device of the user side device and a device to be used for acquiring user side data which is to be used when using the learned model in the user side device.

14. The learned model providing device of claim 10, wherein the processor presents the model information of the selected learned model to the user side device, acquires use information indicating the learned model for which use on the user side device is determined, and when the use information is acquired from the user side device, provides the learned model indicated by the use information to the user side device.

15. The learned model providing device of claim 10, wherein the processor gives an advisability of the learned model to the selected learned model and presents model information of the selected learned model to the user side device, and when information indicating the learned model for which use on the user side device is determined is acquired from the user side device, provides the learned model for which the use on the user side device is determined to the user side device.

16. The learned model providing device of claim 15, wherein the advisability is determined based on at least one of a usage record of the learned model, an evaluation of the learned model, and the number of learning data items used for generating the learned model.

* * * * *